UNITED STATES PATENT OFFICE.

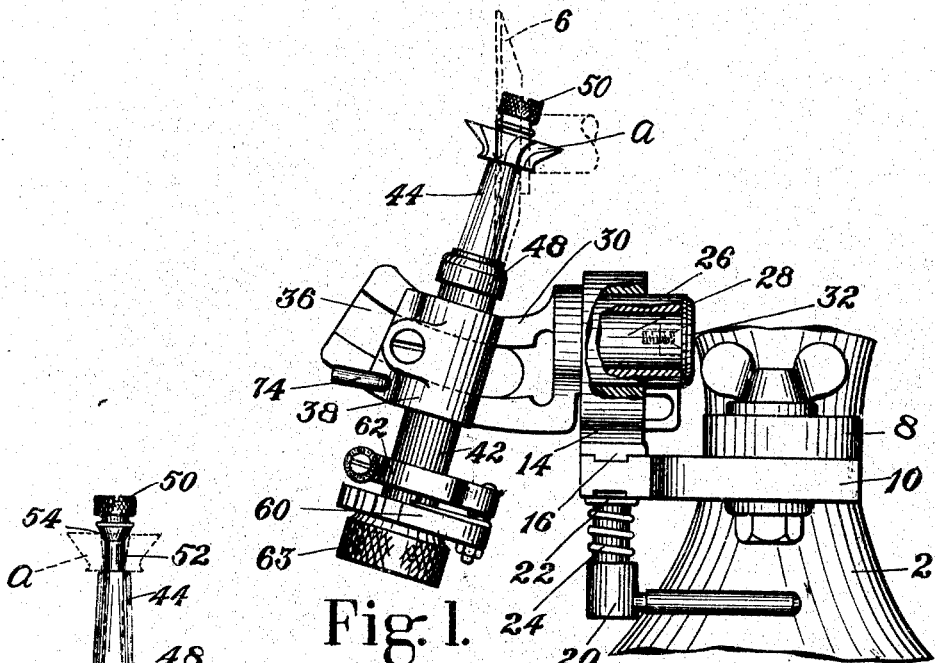
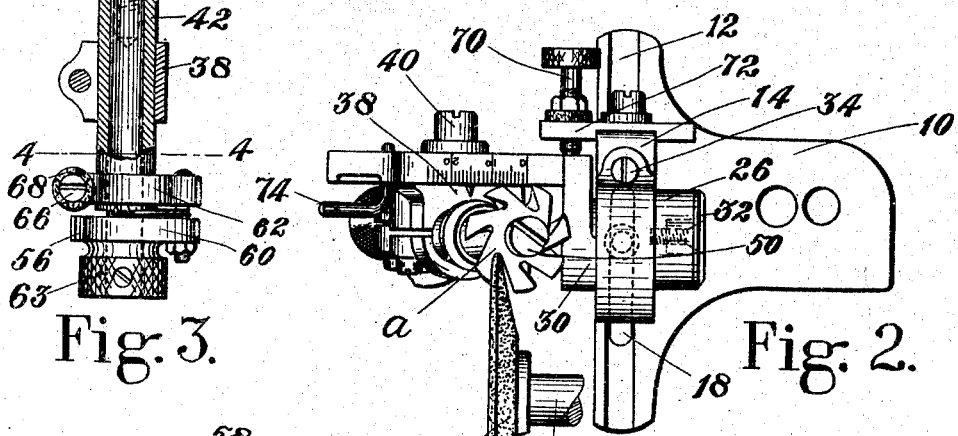
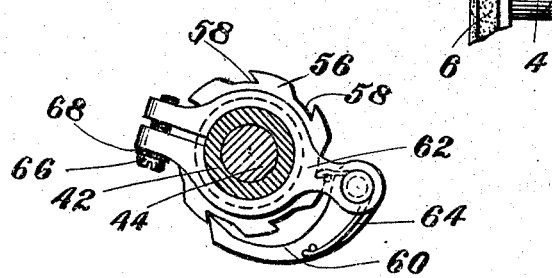

ALBERT LATHAM, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

CUTTER-GRINDING DEVICE.

1,308,085.  Specification of Letters Patent.  Patented July 1, 1919.

Application filed February 24, 1916. Serial No. 80,278.

*To all whom it may concern:*

Be it known that I, ALBERT LATHAM, a citizen of the United States, residing at Beverly, in the county of Essex and State of Massachusetts, have invented certain Improvements in Cutter-Grinding Devices, of which the following description, in connection with the accompanying drawings, is a specification, like reference characters on the drawings indicating like parts in the several figures.

This invention relates to devices for grinding or sharpening the teeth of rotary cutters such as are used, for example, for trimming the edges of soles in the manufacture of boots and shoes; and an object of the invention is to provide a device of this character in the use of which the proper relative locations of the cutter and the grinding member may be accurately determined and the position of the cutter readily controlled so as to insure accurate grinding of the teeth.

In a more particular aspect, an important object of the invention is to provide a device suitable for use in grinding cutters of the type in which the front face of each tooth forms an acute angle with the plane of the cutter, *i. e.* a plane perpendicular to the axis of the cutter, or is angularly disposed with reference to the axis of the cutter, such, for example, as the cutter shown and described in my prior Patent No. 1,104,910, granted July 28, 1914. In cutters of the type shown in said patent the proper angle between the front face of each tooth and the plane of the cutter depends principally upon the difference between the diameters of the opposite ends of the cutter, and consequently in cutters of different shapes, involving substantial variation in the difference between the diameters of the opposite ends, there is a corresponding variation in the angle formed by the plane of the front face of the tooth and the plane of the cutter. It is accordingly a particular object of this invention to provide means constructed to facilitate the accurate grinding of different cutters which present such variation in the angular relation between the front face of the tooth and other elements of the cutter.

To the above and other ends, an important feature of the invention consists in the combination of a grinding member and cutter positioning means constructed and arranged to facilitate relative adjustment for varying the angle between the plane of the grinding member and the plane in which the cutter is held or between the plane of the grinding member and the axis of the cutter. In cutters of the type shown in my prior patent, different cutters may present differences in diameter at their larger ends, involving differences in the angle between the plane of the front face of the tooth and the plane of the cutter, but they are uniform in shape and diameter at their smaller ends, and in the different cutters the line of intersection of the plane of the front face of a tooth and the plane of the smaller end face of the cutter on which the end of the cutting edge of the tooth at the smaller end of the cutter lies, is at a uniform distance from the axis of the cutter. Accordingly the construction herein shown comprises provision for adjustment of the cutter support about an axis coinciding substantially with the end of the cutting edge of a tooth at the smaller end of the cutter when the tooth is in position to be ground, thus permitting angular adjustment of the cutter support for grinding differently shaped cutters without necessitating other adjustment in order to present the teeth of different cutters in proper relation to the grinding member.

A further feature of the invention consists in improved means for determining successive positions of a cutter as it is rotated to present different teeth in position for grinding, constructed to facilitate adjustment for varying the point of angular advance of the cutter teeth.

The above and other objects and features of the invention, including certain novel details of construction and combinations of parts, will now be described with reference to the accompanying drawings and pointed out in the claims.

In the drawings,

Figure 1 is a view in rear elevation of mechanism in which the invention is embodied, a portion of the mechanism being broken away to illustrate the interior construction, and the position of the grinding wheel being indicated in dotted lines, Fig. 2 is a plan view of a portion of the mechanism seen in Fig. 1, Fig. 3 is a view in side elevation of the cutter supporting spindle and associated parts detached, a portion of the structure being shown in section, and Fig. 4 is a section on the line 4—4 of Fig. 3.

A standard 2 is provided with bearings, not seen in the drawings, for a shaft 4 which carries the usual grinding wheel 6 having an outer end face formed for grinding the teeth of rotary cutters. Secured to a lug 8 on the standard 2 is a plate 10 slotted to provide a guideway 12 extending in parallel relation to the plane of the grinding wheel 2. A block 14 is provided with a tongue 16 to fit the guideway 12 and is adjustable lengthwise of the guideway through the provision of a slot 18 in the plate 10 and a pin 20 which extends through said slot and is threaded in the block 14. The portion of the pin 20 below the plate 10 is enlarged to bear against a washer 22 which engages the lower side of the plate 10, whereby the pin is adapted to secure the block 14 in adjusted position. A spring 24 positioned between the washer 22 and the enlarged head end of the pin 20 serves to maintain sufficient friction between the tongue 16 and the groove 12 when the pin 20 is loosened to facilitate accurate adjustment of the block on the guideway.

The block 14 is split to provide clamping means for a sleeve 26 which serves as a bearing for a stud 28 projecting from a bracket 30, the stud being retained in the bearing by means of a cap 32 which is secured to the end of the stud and overlaps the end of the sleeve 26. The clamp is tightened to secure the sleeve in place by means of a screw 34. The bracket 30, which is thus mounted for oscillatory movement in the sleeve 26, is grooved to provide a curved guideway 36 in which is mounted a correspondingly curved projection on a block 38, this projection being indicated by dotted lines in Fig. 1. The block 38 is secured in position on the bracket 30 by means of a clamping screw 40. The block serves as a clamp for a sleeve 42 which provides a bearing for a cutter supporting spindle 44, this spindle having a collar 46 which rests upon the upper end of the sleeve and serves to determine the position of the spindle longitudinally of the sleeve. A cap 48 protects the bearing from emery dust. A cutter, as a, the teeth of which are to be ground, is secured with its smaller end face in engagement with the upper end surface of the spindle 44 by means of a screw 50 which is threaded for engagement in a longitudinal bore in the spindle. Rotary toothed cutters are usually provided with tapering bores to fit a frusto-conical seat on the cutter shaft in order to insure that the cutter may be firmly clamped in position upon the shaft, the diameter of the bore at the outer end of the cutter, which is the smaller end in cutters of the type illustrated, being the same in cutters of different axial lengths and smaller than the diameter of the other end of the bore. In order to secure such cutters firmly in central position upon the spindle 44, the screw 50 is provided with a substantially straight portion 52 of the same diameter as the smaller end of the bore of the cutter, which is the end which should be positioned, as shown, next to the end of the spindle. The screw 50 is formed also with a shoulder 54 of frusto-conical form for engagement with the edge of the bore at the larger end. It will be apparent that with this construction lateral movement of a cutter relatively to the supporting spindle will be effectually prevented by reason of the fact that the straight portion 52 of the screw 50 substantially fits the smaller end of the bore and the shoulder 54 engages the edge of the bore at the larger end. This securing means, moreover, is equally effective for cutters of different axial lengths, since the smaller ends of the bores of such cutters, as above explained, are of uniform diameter, and the frusto-conical shoulder 54 will readily accommodate itself to differences in diameter at the larger end of the bores. A further important advantage of this construction is that there is no tendency for the screw 50 to stick in the bore of the cutter, which would render it difficult to detach the cutter from the screw if the cutter engaging surface of the screw were formed to fit the bore of the cutter. Since the sloping surface of the shoulder 54 forms an acute angle with the surface of the bore, it engages only the edge at the end of the bore, and the cutter therefore is readily freed simply by loosening the screw.

In order to insure that the several teeth of the cutter shall be correctly positioned for grinding upon successive turning movements of the spindle 44, means is provided for determining successive positions in the rotation of the spindle. This means comprises a wheel 56 secured to the lower end of the spindle to turn therewith and having notches 58 corresponding in number to the number of the cutter teeth, and a dog or pawl 60 pivoted to a holder 62 which is clamped upon the sleeve 42, the dog being arranged to engage in the notches 58 to determine the correct successive positions of the spindle. A milled head 63 on the wheel 56 is provided for use in turning the spindle 44. A spring 64 causes the dog to maintain its engagement with the wheel 56. The holder 62 is clamped upon the sleeve 42 by means of a screw 66, the clamping pressure depending upon the adjustment of the screw. In practice the screw should be tightened sufficiently to prevent accidental displacement of the holder 62 while permitting the operator to turn the holder about the sleeve and thus adjust the position of the dog 60 whenever desired without the necessity of loosening the screw. A leather washer 68 between the head of the screw 66 and the holder 62 insures a slightly yielding engagement between the holder and the sleeve. The dog 60 may thus be readily adjusted initially to determine the correct angular position of a cutter about the axis of the spindle 44 or following a preliminary grinding may be adjusted to permit the teeth to be more effectually sharpened.

It will be evident from the preceding description that oscillation of the bracket 30 about the axis of the stud 28 serves to carry a cutter on the spindle 44 into or out of position to be ground by the wheel 6. In Fig. 2 the cutter is shown in position to be ground through engagement of the end face of the wheel with the front face of a cutter tooth. A stop 70 threaded in a bar 72 which is clamped to the block 14 serves by engagement with the bracket 30 to determine adjustably the limit of movement of the cutter toward the wheel, thus preventing the wheel from engaging too deeply between the teeth of the cutter.

As previously explained, it is an important object of the invention to provide means for grinding cutters of different shapes, involving a variation in the angle between the plane of the cutter and the plane of the surface of the tooth to be ground, such that the adjustment for the different cutters may be accomplished as speedily and easily as possible. To this end the curve of the guideway 36 is an arc of a circle whose center is indicated by a cross on Fig. 1, and the sleeve 42 and the spindle 44 in the illustrated construction are so positioned with reference to the holder 38 that this center, as shown, is on a line that coincides substantially with the line of intersection of the plane of the front face of a cutter tooth and the plane of the small end of the cutter when the tooth is in position to be ground, and is parallel to or lies in the plane of the grinding face of the wheel 6, this line thus constituting the axis of adjusting movement of the holder 38 and the spindle 44. Adjustment of the holder 38 in the guideway 36, therefore, while varying the angular relation between the plane in which the cutter is positioned and the plane of the grinding member, will not vary the location of that portion of the cutter which is on said axis, and since, as hereinbefore explained, in cutters of the type shown in my prior patent the line of intersection of the two planes above referred to is at the same distance from and offset from the axis of the cutter in cutters of different shapes, it follows that the only adjustment necessary in changing from a cutter of one shape to a cutter of a different shape is adjustment of the holder 38 along the guideway 36.

In order to facilitate accurate adjustment of the holder 38, the bracket 30 is provided with a scale, as shown in Fig. 2, graduated in degrees corresponding to different degrees of angularity between the axes and the planes of the front faces of the teeth of different cutters, and the holder 38 is provided with a pointer to coöperate with the marks on the scale. In the position shown in the drawings the holder and spindle are set for grinding 15 degree cutters; and since the greater number of cutters of the type referred to which are at present in demand for trimming the shanks of shoes are of a shape requiring substantially this degree of angularity of the front surfaces of the teeth, the device is further provided with a pin 74 positioned in registering bores in the holder 38 and the bracket 30. This pin insures against accidental displacement of the holder 38, and is useful where the cutters to be ground are of uniform shape and the holder 38 is to remain for a long time in the same position. When cutters of other shapes are to be ground, the pin 74 is of course removed. Ordinarily the clamping screw 40 is depended upon and is sufficient to retain the holder in position. It will be apparent that by positioning the holder with the pointer opposite to the zero mark the device may be adjusted to grind cutters in which the front face of the tooth is parallel to the axis of the cutter.

In the operation of the device, a cutter is first clamped upon the end of the spindle 44 by means of the screw 50, with that face of the cutter at the smaller end of the bore in engagement with the end of the spindle. Preliminary adjustments may then be made, if necessary, to change the location of the cutter support with reference to the wheel, as by sliding the block 14 on the guideway 12, after loosening the screw 20, in order to adjust the support transversely of the axis of the grinder shaft 4, or by sliding the sleeve 26 lengthwise in its holder to adjust the cutter support longitudinally of the grinder shaft. If the holder 38 is not already positioned at the proper angle for grinding the cutter in question, it should be adjusted along the guideway 36 and clamped in proper position by the screw 40. Before the rotation of the grinding wheel is started, the cutter support should be swung to carry the cutter approximately to grinding position, and if the dog 60 is not so positioned as to cause the cutter to be presented with the surface of the tooth to be ground in parallel relation to the grinding face of the wheel, the dog should be adjusted by turning the holder 62 about the sleeve 42.

Power is now applied to rotate the wheel 6, and the cutter support is swung to carry the cutter toward the wheel and cause the wheel to operate upon the front face of the tooth. During the grinding of a tooth the spindle 44 is held by the operator, by the milled head 63, to seat the dog 60 firmly in the notch 58 corresponding to the tooth to be ground. The support is then swung to carry the cutter away from the grinding member and the spindle turned to position the dog 60 in the next notch of the series, thus bringing the next tooth into position for grinding. In this manner all the teeth of the cutter may be ground to a uniform extent. If it should then be necessary to grind the teeth further in order to form sharp cutting edges, the holder 62 with the dog 60 may be turned to permit a slight angular advance of the cutter, after which the several teeth may be ground as before. If the teeth are to be ground to any considerable depth, however, it is preferable to change the position of the cutter longitudinally of the shaft 4 by adjusting the sleeve 26 in its holder 14, in order to avoid changing materially the pitch of the teeth.

Although in the construction herein shown the cutter is positioned with its larger end uppermost and the axis about which the cutter support is adjusted consequently lies substantially in the plane of the lower end face of the cutter as thus positioned, it should be understood that the feature of the invention comprising provision for adjustment of the cutter support about an axis disposed as hereinbefore described with reference to the cutter is not dependent upon the location of the cutter in the particular position shown, and that as far as this feature of the invention broadly is concerned the cutter may be variously disposed with reference to its support. The illustrated construction insures that the end face of the cutter in which the axis of adjusting movement of the support should lie shall always be positioned in the same plane through the provision of means for engaging and positioning this face of the cutter, but it will be obvious that various means may be employed for insuring the proper location of different cutters with reference to the axis of adjusting movement of the support irrespective of which end of the cutter is to be positioned uppermost. As to other features, also, it should be understood that various specific embodiments of the invention are comprehended within the scope of the claims. It will be apparent, moreover, that mechanism in which the invention is embodied is not limited to the grinding of cutters of any particular type, but is adapted for grinding cutters of various forms and for various uses.

Having described the invention what I claim as new and desire to secure by Letters Patent of the United States is:—

1. A device for grinding rotary toothed cutters comprising, in combination, a grinding member and a cutter positioning member relatively movable to effect alternate engagement and disengagement of the grinding member and the front face of a tooth to be ground, said members being relatively adjustable about an axis coinciding substantially with the line of intersection of the plane of one end face of the cutter and the plane of the front face of a tooth when the tooth is in position to be ground.

2. A device for grinding rotary toothed cutters of different diameters at their opposite ends comprising, in combination, a grinding member, and a cutter supporting member constructed to position a cutter with its smaller end face in a predetermined location with reference to said supporting member, said members being relatively adjustable about an axis lying substantially at the smaller end face of the cutter as thus positioned.

3. A device for grinding rotary toothed cutters comprising, in combination, a grinding member, and a cutter supporting member constructed and arranged to position different cutters with their corresponding end faces in substantially the same location with reference to said supporting member, said members being relatively movable to effect alternate engagement and disengagement of the grinding member and the surface of a tooth to be ground and relatively adjustable about an axis coinciding substantially with the end of the cutting edge of a tooth at said end of the cutter when said tooth is in position to be ground in order to vary the angular relation between the plane of the grinding member and the plane in which the cutter is presented without varying the location of that portion of the cutter which is on said axis.

4. A device for grinding rotary toothed cutters in which the line of intersection of the plane of one end face of the cutter and the plane of the front face of a tooth of the cutter is at the same distance from the axis of the cutter in cutters of different shapes, comprising, in combination, a grinding member, and a cutter supporting member constructed and arranged to position different cutters with said corresponding end faces in substantially the same plane with reference to said supporting member, said members being relatively adjustable about an axis coinciding substantially with said line of intersection with reference to a tooth when the tooth is in position to be ground.

5. A device for grinding rotary toothed cutters comprising, in combination, a grinding member, and a member for positioning a cutter for the grinding operation, said members being relatively adjustable about an axis coinciding substantially with one end of the cutting edge of a tooth of the cutter when said tooth is in position to be ground.

6. A device for grinding rotary toothed cutters comprising, in combination, a grinding member, and a member for positioning a cutter for the grinding operation, said members being relatively adjustable about an axis lying at one side of the axis of a cutter and substantially in the plane of one of the end faces of the cutter as thus positioned.

7. A device for grinding rotary toothed cutters in which the plane of the front face of the cutter tooth is disposed in different cutters at different angles to the cutter axis but includes a locus positioned in uniform relation to but offset from the cutter axis in the different cutters, comprising, in combination, a grinding member and a cutter positioning member, said members being relatively adjustable about an axis which coincides with such a locus of a cutter tooth when said tooth is in position to be ground.

8. In a device for grinding rotary toothed cutters, the combination with a grinding member, of a cutter support movable to carry a cutter toward or from said member, said support being adjustable about an axis substantially parallel to the cutter engaging face of the grinding member and coinciding substantially with one end of the cutting edge of a tooth when said tooth is in position to be ground.

9. In a device for grinding rotary toothed cutters in which the line of intersection of the plane of one end face of the cutter and the plane of the front face of a tooth of the cutter is at the same distance from the axis of the cutter in cutters of different shapes, the combination with a grinding member, of a cutter support constructed and arranged to position different cutters with said corresponding end faces in substantially the same plane with reference to the support, said support being adjustable about an axis coinciding substantially with the end of the cutting edge of a tooth at said end of a cutter when the tooth is in position to be ground.

10. In a device for grinding rotary toothed cutters having larger ends of different diameters and smaller ends of uniform diameter, the combination with a grinding member, of a cutter support constructed and arranged to position a cutter for the grinding operation with the smaller end face of the cutter in a predetermined plane with reference to the support, said support being adjustable about an axis coinciding substantially with the end of the cutting edge of a tooth at said end of the cutter when said tooth is in position to be ground in order to vary the angular relation between the plane of the grinding member and the plane in which the cutter is presented without varying the location of that portion of the cutter which is on said axis.

11. In a device for grinding rotary toothed cutters in which the plane of the front face of the cutter tooth is disposed in different cutters at different angles to the cutter axis but includes a locus positioned in uniform relation to the cutter axis and substantially at one end of the cutter in the different cutters, the combination with a grinding member, of cutter positioning means adjustable about an axis which coincides substantially with such a locus of a cutter tooth when said tooth is in position to be ground.

12. In a device for grinding rotary toothed cutters, the combination with a grinding member, of cutter positioning means mounted for oscillatory movement to carry a cutter into or out of position to be ground, said means comprising parts relatively adjustable about an axis coinciding substantially with one end of the cutting edge of a tooth of the cutter when said tooth is in position to be ground to vary the angular relation between the plane of the cutter and the plane of the grinding member.

13. In a device for grinding rotary toothed cutters, the combination with a grinding member, of cutter positioning means comprising a member mounted for oscillatory movement in a plane substantially parallel to the plane of the grinding member, and a cutter supporting spindle mounted on said oscillatory member and adjustable relatively thereto transversely of the direction of oscillation to vary the angular relation between the plane of the cutter and the plane of the grinding member, said oscillatory member having a guideway curved about an axis coinciding substantially with the location of a cutter on said spindle to determine the adjusted position of the spindle.

14. In a device for grinding rotary toothed cutters, the combination with a grinding member, of a cutter supporting spindle rotatable to position the teeth of a cutter successively for grinding, said spindle being adjustable transversely to the plane of the grinding member to vary the angular relation between the plane of the grinding member and the plane in which the cutter is presented, and means for determining successive positions in the rotation of the spindle, said means being adjustable with the spindle.

15. In a device for grinding rotary toothed cutters, the combination with a grinding member, of cutter positioning means mounted for oscillatory movement to carry a cutter into or out of position to be ground, said means comprising a cutter support adjustable in different angular relations to the plane of oscillation of said means about an axis offset from the axis of the cutter.

16. In a device for grinding rotary toothed cutters, the combination with a grinding member, of cutter positioning means mounted for oscillatory movement to carry a cutter into or out of position to be ground, said means comprising a cutter support adjustable in different angular relations to the plane of oscillation of said means about an axis coinciding substantially with one end face of a cutter on said support.

17. In a device for grinding rotary toothed cutters, the combination with a grinding member, of cutter positioning means mounted for oscillatory movement to carry a cutter into or out of position to be ground, said means comprising a cutter supporting spindle constructed to position a cutter by engagement with an end face of the cutter, said spindle being adjustable in different angular relations to the plane of oscillation of said means about an axis positioned substantially at said end face of the cutter.

18. In a device for grinding rotary toothed cutters, the combination with a grinding member, of a cutter support rotatable to position the teeth of a cutter successively for grinding, and means for determining successive positions in the rotation of said support, said means comprising a positioning member frictionally held to permit its adjustment about the axis of said support in response to unusual pressure.

19. In a device for grinding rotary toothed cutters, the combination with a grinding member, of a cutter support rotatable to position the teeth of a cutter successively for grinding, and means for determining successive positions in the rotation of said support, said means comprising a member encircling the axis of the support and having depressions corresponding to the number of the teeth of the cutter and a member constructed to enter said depressions in succession to position the support, one of said members being rotatable with the support, and frictional means for restraining the other member normally from rotation about the axis of the support while permitting it to be adjusted about said axis in response to unusual pressure.

20. In a device for grinding rotary toothed cutters, the combination with a grinding member, of a cutter supporting spindle rotatable to position the teeth of a cutter successively for grinding, a sleeve in which said spindle is mounted, a notched wheel on the spindle at one end of the sleeve, a dog arranged to engage the notches of said wheel to determine successive positions of the spindle, and a support for the dog yieldingly clamped to said sleeve to permit adjustment about the axis of the spindle in response to unusual pressure.

21. In a device for grinding rotary cutters having tapering bores, the combination with a grinding member, of a cutter supporting member, and means for determining the position of a cutter on said supporting member, said means having a straight portion of substantially the same width as the smaller end of the bore of the cutter and a portion formed for wedging engagement with the bore at the larger end.

22. In a device for grinding rotary cutters having tapering bores, the combination with a grinding member, of a cutter support having a surface formed for engagement with the end face of a cutter at the smaller end of the bore, and a screw for clamping the cutter upon said surface, said screw having a straight portion of substantially the same width as the smaller end of said bore and a substantially frusto-conical portion constructed to engage the cutter at the larger end of the bore in acute angular relation to the surface of the bore.

23. In a device for grinding cutters having tapering bores, the combination with a grinding member, of a cutter-supporting member, and means for determining the position of the cutter upon the supporting member, said means having portions movable together as a unit, one of the portions substantially fitting the smaller end of the cutter bore and another portion being inclined to engage the opposite extremity of the bore.

24. In a device for grinding cutters having tapering bores, the combination with a grinding member, of a cutter-supporting member, and means for determining the position of the cutter upon the supporting member, said means having portions movable together as a unit, one of the portions substantially fitting the smaller end of the cutter bore and another portion being inclined at a different angle from that of the bore and engaging the larger extremity thereof.

25. In a device for grinding cutters having tapering bores, the combination with a grinding member, of a spindle provided with an end surface against which the cutter operated upon may rest, and a screw threaded into the spindle and having a shank substantially fitting the smaller end of the cutter bore and a frusto-conical shoulder for engagement with the larger extremity of the bore.

In testimony whereof I have signed my name to this specification.

ALBERT LATHAM.

Copies of this patent may be obtained for five cents each, by addressing the "Commissioner of Patents, Washington, D. C."